UNITED STATES PATENT OFFICE.

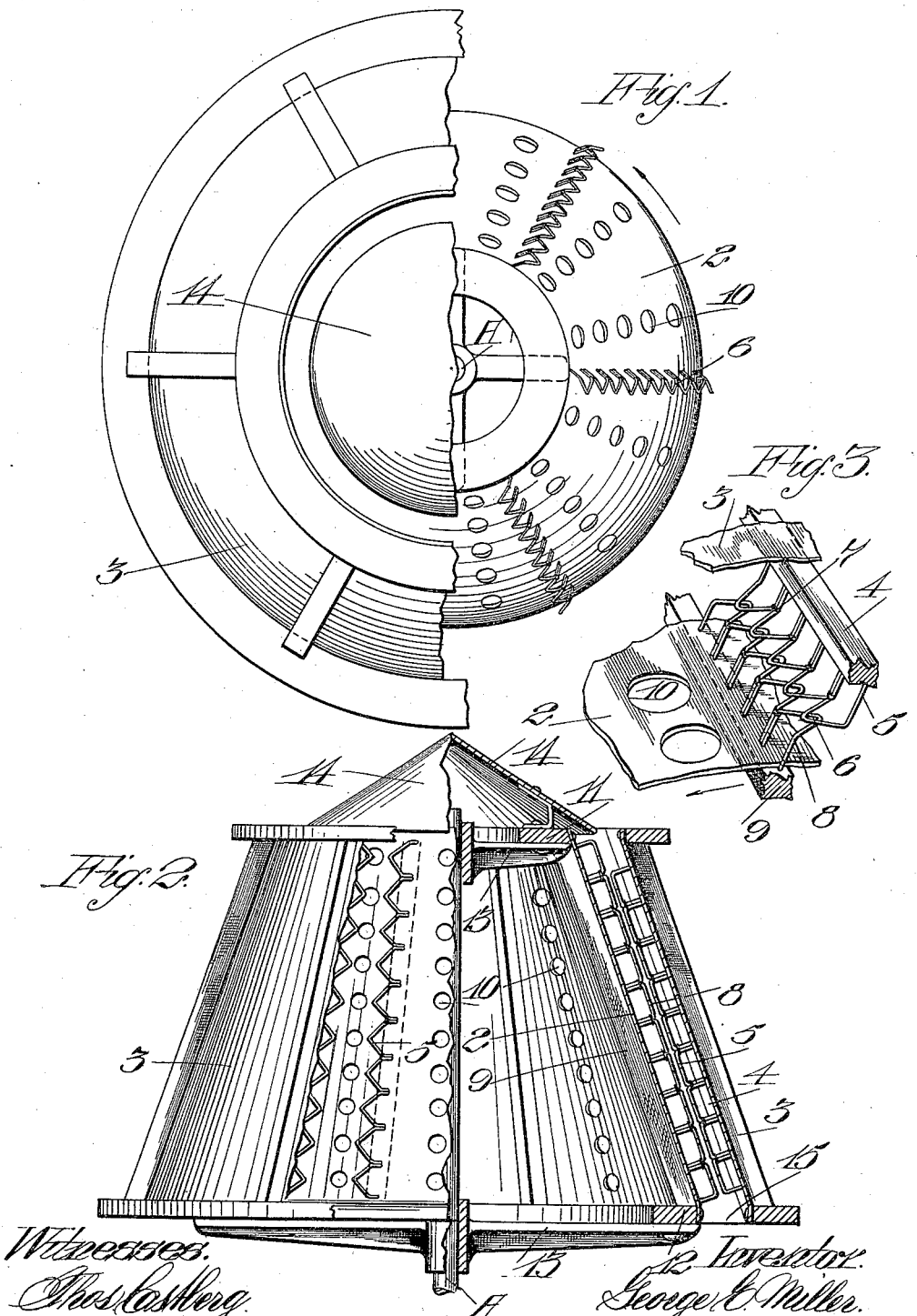

GEORGE E. MILLER, OF SACRAMENTO, CALIFORNIA, ASSIGNOR TO E. CLEMENS HORST COMPANY, OF SAN FRANCISCO, CALIFORNIA, A CORPORATION OF NEW JERSEY.

HOP-CLUSTER STEMMER.

1,013,505.                    Specification of Letters Patent.         Patented Jan. 2, 1912.

Application filed May 5, 1910. Serial No. 559,621.

*To all whom it may concern:*

Be it known that I, GEORGE E. MILLER, citizen of the United States, residing at Sacramento, in the county of Sacramento and State of California, have invented new and useful Improvements in Hop-Cluster Stemmers, of which the following is a specification.

My invention relates to a machine especially designed for use in the hop-picking industry for stemming hop clusters.

Hops are generally grown on trellises from sixteen to twenty feet high, the vines being trained over these trellises. In picking by machinery, the vine stalks are cut about four feet from the ground and passed through the hop-picking machine, the hops being removed mechanically from the vines during the traverse of the latter through the machine. Some of the hops are removed from the vine in the form of clusters or bouquets, such clusters having more or less of the stems or small branches, which are undesirable in the finished product, and it is necessary to pull these clusters apart to free the hops from this trash.

The object of the present invention is to design a simple, practical machine of large capacity for this work.

The invention consists of the parts and the construction and combination of parts as hereinafter more fully described and claimed, having reference to the accompanying drawings, in which—

Figure 1 is a plan view of the invention, one-half of the outer casing being broken away to show the inner stemming centrifugal cone. Fig. 2 is a side elevation in partial section of the invention. Fig. 3 is a detail of the coöperating series of outer and inner, or stationary and movable, pickers.

In the practical embodiment of the machine, I mount a vertical, revoluble shaft A on a suitable framework. Coaxial with shaft A and with each other are two truncated stemming cones 2, 3, the outer cone 3 being stationary or revolving, and the inner cone 2 secured to shaft A and revolved therewith. These cones 2—3 may be of any suitable size, material, and form of construction. In practice, the outer cone is inclosed and made of sheet or galvanized iron, with lengthwise extending bars 4 on its inner periphery, these bars carrying suitable inclined elastic V-shaped wire pickers 5, these wires being bent centrally so as to include inclined V-shaped spaces, with the apexes 6 of these spaces closed, the legs of the wires being fixed in the bars 4, and the legs of adjacent wires being suitably tied or connected together at their angles, as shown at 7, Fig. 3. The inside cone 2 comprises essentially a similar set of outwardly projecting V-shaped pickers 8 arranged substantially tangential to the outer pickers 5, pointing in an opposite direction, so that when the inner cone 2 is revolved, its pickers 8 will rub across the outer pickers 5 in such a way that any two pickers 8—5 will inclose between them, while passing one another, a gradually reducing diamond-shaped space, as shown in Fig. 3. The pickers 8 of the inner cone are secured on lengthwise extending bars 9 similar to the outside stationary bars 4, and the inner cone may have a smooth continuous inner surface, or it may be perforated, as shown at 10, at intervals between the series of pickers, to let the stemmed hops and petals drop through, or it may consist simply of a skeleton framework made up of the lengthwise extending bars 9 and pickers 8, with the bars 9 suitably supported on upper and lower rings 11—12 carried on the radial arms 13 on shaft A. The cones 2—3 are suitably spaced so as to allow of one set of pickers properly passing the other. The top of the inner cylinder 2 is covered by a suitable deflecting cone 14 on which the hop clusters to be treated are deposited, down which cone or deflector the hops slide and are deposited in between the two cones or drums.

In practice, the shaft A is revolved at suitable speed and the hop clusters deposited on the deflector 14, passing thence down, as before described, into the space between the two cones and between the coacting series of pickers 5—8. The inner cone with its longitudinal series of pickers throws out the clusters against the inclosed outer cone. These clusters being caught in between the pickers 8 and 5, are pulled apart, and the stemmed hops travel gradually downward to the point of discharge, represented at 15, this discharge being, of course, entirely around the base of the two conical drums. The stemming of the clusters results from the combined centrifugal action of the inner drum and the opposed coacting picking devices 5 and 8.

Having thus described my invention, what I claim and desire to secure by Letters-Patent is—

1. A cluster-stemming machine comprising two coacting conoidal drum members, one inside the other, and arranged with their axes vertical, and inclosing between them an annular space to receive the clusters, means for revolving the inner drum member, and oppositely disposed V-shaped pickers on the adjacent faces of the two drum members.

2. In a cluster-stemming machine, the combination of two vertically arranged drum members, one inside the other, each in the form of a truncated cone, and inclosing an annular cluster-stemming space between them, means for revolving one of the drums, and cluster-rending means in said annular cluster-stemming space, said last-named means including longitudinal series of inclined V-shaped pickers carried by the outer drum member, said pickers projecting into said annular space, and another longitudinal series of V-shaped pickers on the inner drum member projecting into said annular space.

3. In a cluster-stemming machine, the combination of two vertically arranged drum members, one inside the other, each in the form of a truncated cone, and inclosing an annular cluster-stemming space between them, means for revolving one of the drums, and cluster-rending means in said annular cluster-stemming space, said last-named means including longitudinal series of inclined V-shaped pickers carried by the outer drum member, said pickers projecting into said annular space, and another longitudinal series of V-shaped pickers on the inner drum member projecting into said annular space, the apexes of said outer and inner series of pickers pointed in opposite directions and arranged in planes parallel to tangent to the conoidal surfaces of the drums.

In testimony whereof I have hereunto set my hand in the presence of two subscribing witnesses.

GEORGE E. MILLER.

Witnesses:
LESTER J. HINSDALE,
THEO. EDER.

---

Copies of this patent may be obtained for five cents each, by addressing the "Commissioner of Patents, Washington, D. C."